United States Patent [19]

Martin

[11] 4,010,960
[45] Mar. 8, 1977

[54] ROTATING SEAL
[75] Inventor: Jean Martin, Chatillon, France
[73] Assignee: Groupement pour les Activities Atomiques et Advancees "GAAA", Le Plessis-Robinson, France
[22] Filed: Oct. 7, 1975
[21] Appl. No.: 620,456
[30] Foreign Application Priority Data
Oct. 21, 1974 France .............................. 74.35285
[52] U.S. Cl. .................. 277/3; 277/59; 277/134; 277/203
[51] Int. Cl.² ........................................ F16J 15/40
[58] Field of Search ............ 277/3, 134, 59, 203, 277/13, 14 V, 22

[56] References Cited
UNITED STATES PATENTS

| 2,799,522 | 7/1957 | King et al. | 277/22 X |
| 3,131,942 | 5/1964 | Ertaud | 277/134 X |
| 3,622,164 | 11/1971 | Herbert | 277/63 |
| 3,700,247 | 10/1972 | Butler et al. | 277/134 |
| 3,778,070 | 12/1973 | Shimura | 277/134 |

Primary Examiner—Richard E. Aegerter
Assistant Examiner—L. Footland
Attorney, Agent, or Firm—Sughrue, Rothwell, Mion, Zinn & Macpeak

[57] ABSTRACT

Rotating seal sealing by viscous effect, intalled on a rotating shaft crossing through a bore separating, from the outside medium, an enclosure containing a fluid kept under pressure, comprising at its center two threads having an unequal length and having reverse pitches, separated by a groove and two lip seals for a rotating shaft of the conventional type on either side of the threads. The gap between the two lip seals is fed with viscous fluid by two tanks, one of which is at the pressure of the fluid for which sealing is to be provided. Application to the passing of shafts rotating at a high speed for all types of enclosures containing a gas or a liquid under pressure which can reach several tens of bars.

18 Claims, 5 Drawing Figures

ROTATING SEAL

BACKBROUND OF THE INVENTION

1. Field of the Invention

The present invention concerns a rotating seal ring sealing by viscous effect, ensuring excellent rotary sealing for relatively high pressures and speeds, it being possible for the pressure to increase without inconvenience with the speed.

2. Description of the Prior Art

Numerous devices intended for ensuring the fluid-tight sealing along a rotating shaft crossing through a wall limiting an enclosure containing a fluid kept under a high pressure, whereas the other part of the shaft is in a space in which atmospheric pressure prevails are known.

It is known that a certain number of these devices are based on the use of a rotating seal consisting of a thread cut in a shaft rotating in a bore formed in the wall of separation between the two fluids.

It is also known that the sealing of this type of seal depends directly on the viscosity of the fluid for which sealing is to be provided, on the speed of rotation of the shaft and lastly on the play existing between the rotating shaft and the bore formed in the separation wall. For equipment of an industrial type, operating at current speeds in the order of a few thousands of revolutions per minute and for usual fluids having slight viscosity, such as water, air or gas, calculations show easily that the use of such seals is possible only if the clearance between the rotating shaft and the bore is very slight, Now, it is not possible, on an industrial scale, to reduce the clearance beyond certain limits. Indeed, even if the shaft and the bore have been manufactured with all the required precision, the least defect in centring or the least local expansion of the shaft, due, for example, to an unforeseeable thermal effect, leads to irremediable and permanent seizing of that seal.

Moreover, it is known that these seals do not provide static sealing.

Furthermore, it is known that seals for rotating shafts of the conventional type such as, for example, lip seals, generally made of an elastomer or of a plastic material, provide very satisfactory sealing and have a suitable service life on condition that the pressure for which sealing is to be provided when the shaft is in motion remains relatively slight, in the order of 1 bar, for example and that the peripheral speed of the shaft does not exceed a few metres per second. It should moreover be observed that when the difference between the pressures on the 2 faces of the seal is very slight or, even, zero, this type of seal allows high peripheral speeds in the order of 20 metres per second. Lastly, these seals ensure easily static sealing without giving rise to any problem. To simplify the language, these seals for rotating shafts of the conventional type will be designated by the expression "lip seal for a rotating shaft".

It is also known that devices combining two threads of equal length, with reversed pitches, cut in the shaft, with two lip seals arranged on the shaft on either side of the two threads.

In these known devices, the rotation of the shaft generates a certain overpressure at the centre between the two threads. Small receptacles installed in series intended probably to absorb a part of the oil coming in at overpressure are accomodated in certain devices in that central space. In other systems, journals sliding axially under the action of the central overpressure as soon as the rotation speed is sufficient are accomodated in that space. These journals then raise the lips of the lip seals arranged on either side of the two threads. That symmetry of operation requires a symmetry in the structure and the two threads must have an equal length. It will be seen immediately that the criticisms made above with respect to the two types of seal also remain applicable, at least partly, in the case of this device.

SUMMARY OF THE INVENTION

To produce a seal assembly providing excellent rotary shaft sealing and to obviate the drawbacks described previously, the Inventor has contrived a device combining the two preceding types of seals and maintaining, during the rotation of the shaft, a counterpressure on the inside face of the lip seals which is very substantially equal to the pressures exerted on the outside faces. In this way, lip seals for a rotating shaft of the conventional type are subjected to only a practically zero differential pressure during the rotating of the shaft. On the other hand, when the shaft is completely stopped, they are subjected to the total fluid pressure.

The object of the invention is therefore a fluid seal ring assembly providing sealing by viscous effect, installed on a rotating shaft crossing through a bore formed in a wall separating, from the outside medium, an enclosure containing a fluid kept under high pressure, comprising, at the level of the bore, two threads separated at their centre by a groove and limited at their periphery by lip seals of the conventional type, for a rotating shaft, two tanks of viscous liquid, cooling means, means for balancing the pressures, characterized in that the two threads have unequal lengths and are cut on one of the contiguous cylindrical faces in such a direction that each of the two threads will tend to drive the said viscous liquid towards its periphery in the direction of the lip seals.

The space comprised between the bore and the shaft, limited by the lip seals for rotating shafts is fed with viscous liquid by means of two passages leading out, on either side of the two threads, in the immediate vicinity of the lip seals for rotating shafts. The two threads, having reverse pitches, push back the viscous liquid towards the lip seals and generate, between the two threads, a great depression, contrary to seals of known type. The length of these threads is calculated so as to balance the maximum pressure which can be exerted on the outside face of the lip seal. That lip seal is then in those operating conditions in which it can bear without wear high speeds and where it can withstand all the pressure applied when the shaft is stationary.

Such a device would however make it possible to obtain that balance of pressures only for a given rotation speed and for a given viscosity of the viscous liquid. Now, the rotation speed of the shaft is often subjected to variations which can even assume a cyclic character and the viscosity of the fluid varies with the temperature; now, the latter depends in its turn on the operating conditions of the shaft. It was therefore indispensable to have available a means ensuring the permanent balance of the pressure exerted by the fluid of the enclosure and of the pressure exerted by the viscous liquid fluid on the other face of the seal. It is therefore a characteristic of the invention to put the viscous fluid tank in constant relation with the pressure exerted on the other side of the lip seal, the balancing of that pressure by the pumping effect of the thread causing the meniscus of the viscous fluid to move along the shaft on the thread.

The length of the thread is calculated as a function of the maximum pressure which can be produced in the enclosure to be sealed off.

The two threads are separated, according to another characteristic, by a shallow groove so that it cannot diminish the strength of the rotating shaft.

The invention is exposed in greater detail in the examples described hereinbelow with reference to the drawings with like elements bearing like numerical designations.

DESCRIPTION OF PREFERRED EMBODIMENTS

Figure 1:
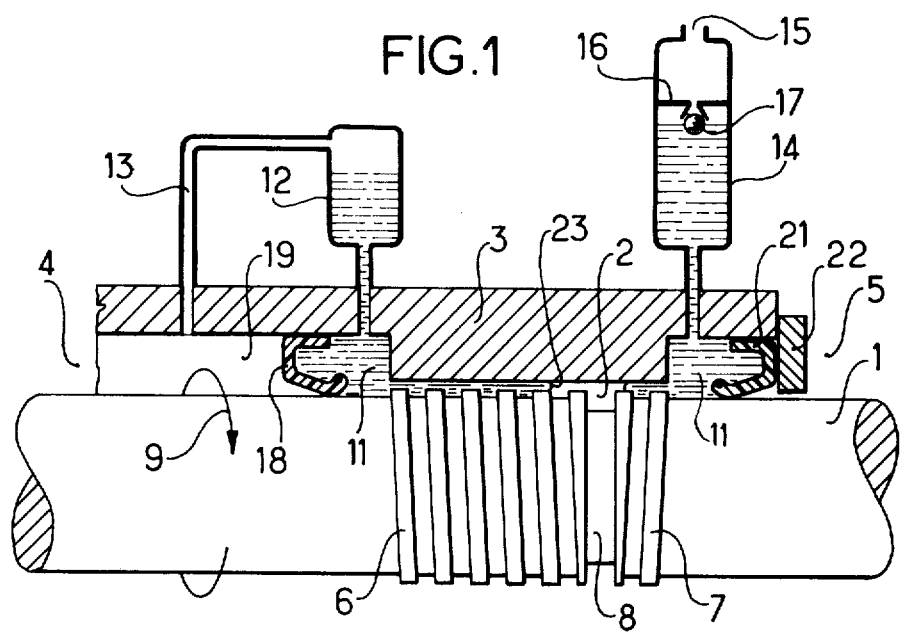
FIG. 1 is a sectional view of one embodiment of the invention.

FIG. 1 describes the rotating seal ring sealing by viscous effect applied to a shaft 1 crossing through the bore 2 formed in an element 3 integral with the wall separating a fluid medium within space 4 kept at a high pressure from the atmosphere 5.

Nevertheless, it is self-evident that the atmosphere 5 could be replaced by any other fluid medium kept simply at a different pressure from that of the fluid medium of space 4 without any modification of the invention.

The rotating seal ring sealing by viscous effect comprises at its centre two threads 6 and 7 cut on the shaft 1 and separated by a groove 8. It will be observed that the two threads have reverse threads so that, when the shaft rotates in the direction shown by the arrow 9, any fluid which is in the gap comprised between the bore 2 and the shaft 1 is pushed back towards the opposite end to the groove by the pumping effect exerted by the threads.

The direction in which the parallel threads must be cut is therefore that which drives the fluid from the groove 8 towards the periphery of the lip seal; it is therefore the direction to be imparted to a screw pitch on the shaft to drive that shaft, if it crossed a fixed nut, in an axial movement towards the pressure against which sealing is to be provided, from the groove towards the periphery of the lip seal.

The thread 6 is fed with viscous liquid 11 by the tank 12, which is itself kept at the pressure prevailing inside the enclosure space 4 against which sealing is to be provided by means of the pipe 13.

Likewise, the thread 7 cut in the reverse direction to the thread 6 is fed with viscous liquid 11 by the tank 14 provided with a filling opening 15 keeping the liquid 11 at atmospheric pressure. That tank 14 comprises, moreover, a valve type closing device 16 provided, for example, with a ball 17 which is applied against the orifice of the valve 16 when the pressure of the viscous liquid 11 rises in the tank 14 to a level slightly higher than atmospheric pressure and would tend to make the level of the liquid rise rapidly in that tank.

Lastly, the seal assembly sealing by viscous effect comprises, at both its ends, lip seals 18 and 21 for rotating shafts, made of an elastomer. The lip seal 18 placed on the high-pressure side. That lip seal 18 is not subjected to any difference in pressure, due to the balancing of the pressures by the pipe 13.

That lip seal 18 ensures therefore, in actual fact essentially the separating, along the shaft, between the fluid within space 4 against which sealing is to be provided and the viscous liquid 11. That lip seal 18 is arranged in an enlarged bore 19 into which leads out the pipe 13 maintaining, across the surface of the viscous liquid in the receptacle 12, a pressure which is constantly equal to the pressure prevailing in the enclosure.

The lip seal 21 can, be a seal such as that shown in FIG. 1. It can also be a compound seal constituted by one seal element having a U-shaped cross-section and by a second element comprising an O ring. In all cases, it is solidly pressed against a metal strengthening part 22, for it is seal 21 or seal 21' which bears, when the shaft is stationary, all the pressure of the enclosure.

The thread 6 pushes back, by the longitudinal pumping effect, the viscous liquid 11 which seeps in between the shaft and the bore under the effect of the pressure transmitted to the liquid 11 by the tank 12. That thread is calculated as a function of the rotation speed, the diameter of the shaft, the viscosity of that fluid 11, the maximum pressure which it can be made to bear taking into account also the thickness of the film of liquid defined itself by the clearance tolerated on the shaft. The pressure balanced by the liquid film being inversely proportional to the square of the thickness of that film, it is easy to determine the value of the permissible clearance.

Calculation and experience have shown that for a given pressure, the thread 6 keeps small longitudinal dimensions as long as the clearance of the shaft does not exceed two tenths of a millimeter for the preferred viscous fluids. It was therefore possible to produce a thread giving a satisfactory pumping effect by allowing, for the shaft, industrial manufacturing tolerances comprised between 0.1 and 0.2 millimeters. The thread chosen is a helical thread with a multiple pitch having an inclination of 75° in relation to the generating line of the cylinder. The thread has a rectangular cross-section such that the full part is of equal size to the hollow part, the width thus defined being at the most equal to a millimeter. The depth of the thread has been chosen so that it is close to 2.5 times the tolerated clearance between the radius of the shaft and that of the bore.

The thread 7 is calculated exactly in the same way but only for a pressure slightly greater than atmospheric pressure, taking into account the same parameters as for the calculating of the thread 6. It is easily conceivable that the length of the thread 7 will be in general much shorter than that of the thread 6.

The preferred viscous liquid 11 has been chosen from among fluids having quite a high viscosity in the order of 500 to 2000 centistokes, such a glycerine or a silicone oil. The latter has, as a general rule, high chemical inertia which makes it suitable for use with numerous products, excellent resistance to heat up to temperatures in the order of 200° C, as well as a very slight decrease in viscosity with the rise of temperature.

In certain embodiments, oils having an increase in viscosity with the temperature have also been used with success.

In all cases where it is not desirable to cut threads and a groove on the rotating shaft, these threads can be formed on the inside face of a cylindrical sleeve which is made integral with the bore. In that case, it is that sleeve which bears the seal.

In the light of the preceding description, the operation of that seal in the most general case may easily be understood:

When the shaft is stopped, the pressure of the enclosure is borne by the seal as a whole, as follows: that pressure is applied through the pipe 13 to the viscous liquid 11 and consequently to the inside face of the lip seal 18. It is also applied to the outside face of the same lip seal 18. In this way, that rotating seal 18 is subjected to the same pressure on both faces. It can therefore without fatigue ensure the separation between the fluid in space 4 under pressure and the viscous fluid 11. That fluid seeps along the shaft and is applied against the lip seal 21. That lip seal 21 is therefore subjected, on the stopping of the shaft, to the full pressure of the fluid in the enclosure, exerted through the viscous liquid 11 which now fills the two threads and the intermediate groove. It is to enable the lip seal to hold at the full pressure that it is reinforced by a metal strengthening part 22.

Furthermore, the pressure rises in the tank; the level of the fluid 11 in that tank has a tendency to rise. The ball 17 blocks the orifice of the valve 16 and prevents the oil from escaping.

When the shaft starts up, the pumping effect due to the threads begins to produce its effect. The thread 6 tends more and more to bear the pressure as the rotation speed of the shaft increases. In the groove 8, the viscous fluid 11 is pumped by the thread 6, the pressure decreases therein and tends towards a vacuum. Likewise, the thread 7, on rotating, pushes the viscous fluid 11 which it contains back, that fluid having a tendency to come back towards the groove 8 in which a certain depression now prevails. The lip seal 21 which stopped all the pressure is rapidly relieved and, from a certain speed onwards, it is no longer subjected to any differential pressure, since the thread 7 has precisely been calculated to apply a pressure substantially equal to the atmospheric pressure on the outside face of the lip seal 21.

The lip seal 18 continues to be subjected on both its faces to the same pressure. The adjusting of the pressures between that generated by the thread 6 and that of the pressure against which sealing is provided is effected automatically by the variation of the wetted length of the thread defined by the position of the meniscus 23. If the pressure to be contained decreases, the meniscus moves towards the left in FIG. 1; if it increases, it moves towards the right. The variation in the volume of liquid pumped is resorbed by the tank 12 constructed specially for that purpose. Moreover, the viscous fluid ensures, on its part, constant lubricating of the seal 18.

Likewise, the thread 7 prevents the liquid of the tank 14 comprised in the space situated between the lip seal 21 and the thread 7, from escaping towards the depression zone of the groove 8. Only the wetted length of the thread 7 is subjected to the pressure which is then very substantially equal to the atmosphere, the lip seal 21 prevents, however, the viscous fluid from escaping towards the outside. The lack of difference in pressure on its two faces of these two lip seals ensures operation without wear. In the tank 14, the valve 16 has been arranged, subsequent to numerous experiments which have shown that the depression which prevails in the groove 8 produces a certain permanent degassing of the viscous liquid which results in the appearance of very small droplets of air at the surface of the liquid contained in the tank 14. These droplets are removed by the valve 16. In certain of his embodiments, the Inventor has replaced that valve 16 by a wall which is porous to gases but not to vicous fluids.

By operating with 40 mm and 50 mm shafts, rotating at 3000 r.p.m., it was possible, with the seal according to the invention to provide excellent sealing in an enclosure kept at a pressure in the order of several tens of bars, from 35 to 50 bars, for example, the threaded length on the high-pressure side being in the order of 50 millimeters, the shaft having a normal clearance of an industrial kind, the seal as a whole then having a length of less than 75 mm.

Figure 2:
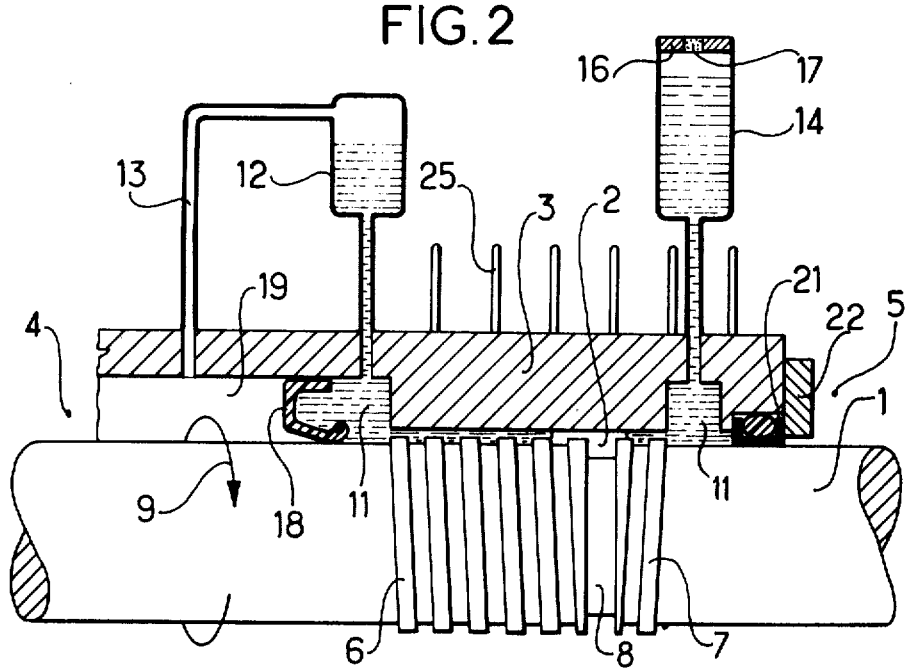
FIG. 2 is a sectional view of a second embodiment in which cooling is provided by fins.

FIG. 2 shows an embodiment closely resembling the basic device described with reference to FIG. 1. As in FIG. 1, the shaft 1, crossing through the bore 2 and bearing two threads 6 and 7 separated by a groove 8, may be seen therein. The elastomer seal 18 on the high-pressure side is similarly a lip seal fed with viscous fluid 11 by the tank 12.

On the low-pressure side, the thread 7 remains unchanged; the tank 14 bears, at its top part, a porous barrier 17 intended for removing the little droplets of air which appear at the surface of the viscous fluid in the tank 14. That porous barrier, permeable to gases, remains impermeable to viscous fluids.

The seal 21 used is a compound seal having a U-shaped cross-section reinforced by an elastomeric O ring.

Experience has shown that it was necessary to provide cooling for the seals, for there are two sources of heat:

The slight friction of the lip seals 18 and 21 on the rotating shaft 1;

The viscosity of the viscous fluid used.

Cooling fins 25 have therefore been arraged on the element 3 integral with the separation wall.

Figure 3:
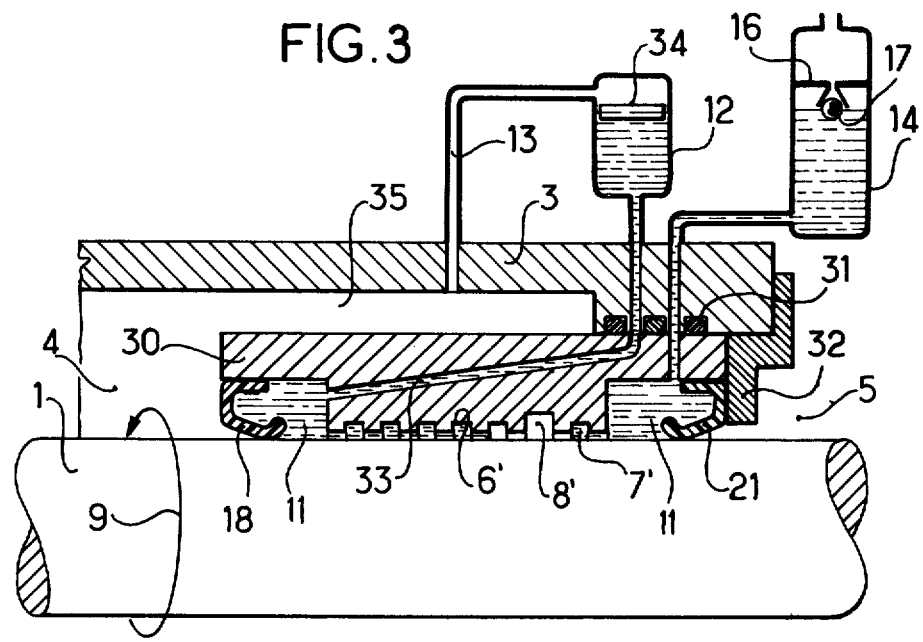
FIG. 3 is a sectional view of another embodiment with improved cooling.

FIG. 3 corresponds to a seal according to the invention in which the threads 6' and 7' and the groove 8' have been transferred to the bore. Circumstances have therefore led, for reasons of ease of machining, to the inserting, between the element 3 integral with the separation wall and the shaft 1, of a sleeve 30 in whose inside face have been machined the threads 6' and 7' and the separating groove 8'. A shaft 1 can therefore be used without making it undergo transformations and without weakening it in any way. Between the sleeve 30 and the element 3 of the wall of the enclosure to be sealed, a vast circular space 4 which extends right along the sleeve has been provided. That space, filled with fluid under pressure, provides effective cooling of the seal. Such an arrangement is, for example, provided to great advantage if the shaft is used for pumping a cold fluid contained under pressure in the receptacle to be sealed. Communication between the tank 12 and the thread 8' is provided through the sleeve by a longer pipe 33. In the case where the fluid to be sealed can be mixed, is soluble in the viscous liquid, it is indispensable to ensure the separating of the mediums by an insulating piston 34. Static O rings 31 are inserted between the sleeve 30 and the element 3 fast with the separation wall. The dissipating of heat is also reinforced by means of a metallic block 32 made of a substance which is a good heat conductor such as copper or aluminium, or by means of an alloy of metals which are good heat conductors. That block 32 reinforces, at the same time, the seal 21. That seal 21 is, in the present case, a lip seal.

Figure 4:
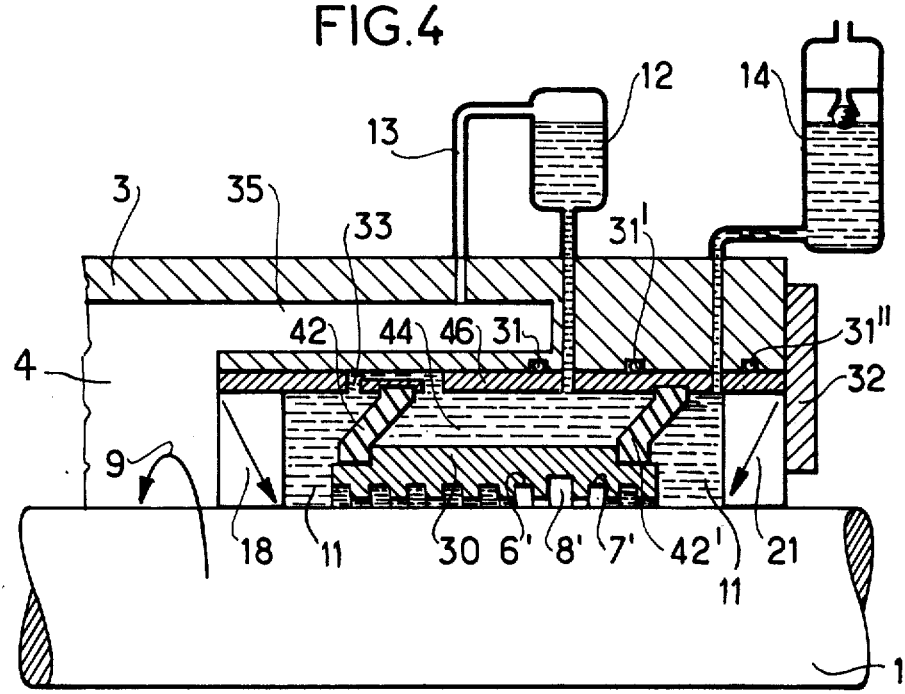
FIG. 4 is a sectional view of yet another embodiment provided with a radial suspension seal.

FIG. 4 shows a device which is fairly close to the device described with reference to FIG. 3. The lip seals 18 and 21 are shown diagrammatically. An annular space 44 is provided between the sleeve 30 and the element 3 integral with the separating wall. The seal 18 is identical to the seal 21. It can comprise an elastomeric element of the conventional type such as that of a lip seal or that of a compound seal extended by a tubular portion itself connected to the flange of a metallic sleeve.

O rings 31, 31' and 31" provide sealing with respect to the pressure applied to the enclosure.

The seal 21 comrprises, in the same manner, an elastomeric portion fitted, like the seal 18, with a tubular elastomeric portion connected to the flange of a metallic sleeve. A cross-piece 46 supports the seals 21 and 18. It is made of the same substance as the element 3 fast with the separating wall.

The sleeve 30 bearing the threads 6' and 7' is pressed against the shaft 1 by means of the two flexible sleeves or cross pieces 42 and 42' which thus provide a resilient suspension function of that sleeve by means of their flexibility.

The result of this is that if the shaft is slightly "out-of-round", the sleeve 30 is liable to move in a slight linear movement in a transversal direction in relation to the shaft on account of the flexibility of the cross-pieces 42 and 42'. In this way, the threads continue to exert their pumping action without disturbance, the variation in the thickness of the viscous layer being minimized by the slight linear movement of the sleeve. Finally, the effective clearance between the shaft and the sleeve will remain very slight, although the construction of the shaft can be defective. That aptitude of the sleeve 30 to follow the irregularities of the shaft 1 is of great interest, for it makes it possible to reduce, in considerable proportions, the disadvantges of a clearance between the shaft and the seal.

Conversely, for a shaft of normal industrial quality, for which the clearance between the sleeve and the shaft is in the order of one-tenth of a millimeter, the use of a sleeve thus installed on a resilient system makes it possible to improve the pumping effect and the sealing or to make use of a sealing fluid which is less viscous.

A slight triangular notch have a short length formed on the inside face, in the order of a few millimeters from the sleeve 30, facing the rotating shaft 1, makes it possible further to improve that aptitude of the seal to match the irregularities of the shaft.

Figure 5:
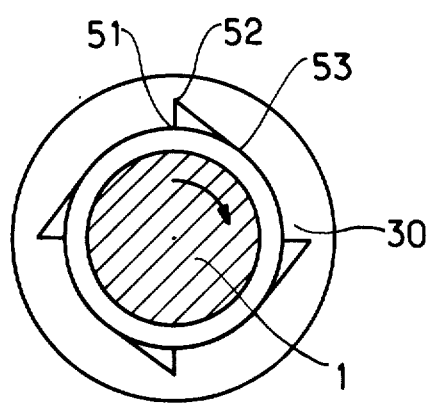
FIG. 5 is an end-on view of a portion of the embodiment of FIG. 4 showing the shaft and of the sleeve which surrounds it.

The function of those notches will be understood on referring to FIG. 5 showing an end-on-end view of the sleeve 30 surrounding the shaft 1.

Notches having a short length, with a triangular cross-section, arranged symmetrically in relation to the axis of rotation, are cut from the entrance of the sleeve, parallel to the generating lines of the sleeve. These notches each form a triangle such as 51, 52, 53, the slope of the face 51–52 being chosen shorter than that of the face 52–53. At the time of the rotation of the shaft 1, the viscous fluid existing at the level of the notches at both ends of the sleeve exerts a force which tends to raise the sleeve at the point 53. The notches being symmetrical, the forces brought into play cancel each other out. Nevertheless, if an irregularity of the shaft approaches the point 53, an extra uncompensated force which will tend to move the sleeve away from the shaft and will thus prevent the catching of the sleeve will be exerted. The number of these notches is in general limited to 4.

The sleeve 30 is, in numerous cases, made of aluminium, this having the advantage of simplified matchining and a pronounced aptitude for dissipating heat and low inertia enabling it to undergo without difficulty slight linear movements due to a defect of the rotating shaft.

Lastly, it should be observed that in the present case, the volume 44 comprised between the element 3 and the sleeve 30 is filled with viscous liquid 11.

It is separated from the mass of the fluid to be sealed only by a relatively thin layer of metal 30, so that the volume 44 is cooled by the fluid to be sealed and contributes in its turn to the cooling of the viscous liquid constantly moved by the thread 6.

Although the device which has just been described may appear to provide the greatest advantages for the implementing of the invention, in a particular technical situation, it will be understood that various modifications bearing more particularly on rotating seals can be applied without going beyond the scope of the invention.

I claim:

1. In a seal assembly for a rotating shaft effecting sealing by viscous effect, and having a rotating shaft extending through a bore formed in a wall separating, from the outside medium, an enclosure containing a fluid kept under high pressure, said assembly comprising, at the level of the bore, a sleeve mounted within said bore and surrounding said shaft and defining with said shaft opposed continuous cylindrical faces, first and second threads within one of said faces separated at their center by a groove and limited at their periphery by first and second lip seals for said rotating shaft, of the conventional type, two tanks of viscous liquid, cooling means, means for balancing the pressures between said viscous liquid and said high pressure fluid, the improvement wherein said threads have unequal lengths and are cut on one of the continuous cylindrical faces in opposite pitches such that each of said threads tend to drive said viscous liquid towards its periphery in the direction of the lip seals.

2. The seal assembly according to claim 1, wherein: the end of the longest thread opposite to the groove forms along the shaft with the first lip seal a space fed with viscous liquid fed by a first tank and the end of the shortest thread, opposite to the groove defines along the shaft with the second lip seal a space fed with viscous liquid from a second tank.

3. The seal assembly according to claim 1, wherein: the longest thread consists of a helical thread having a multiple pitch cut on the shaft in a direction such that if the shaft is assumed to be rotating in a fixed nut, the movement of the shaft would draw it towards the first lip seal so that the thread exerts on the liquid film a discharge action tending to compensate the pressure applied to the viscous liquid by the first tank.

4. The seal assembly according to claim 3, wherein: the first tank of viscous liquid is conncted permanently to the enclosure kept under pressure through a pipe and the first lip seal is in permanent contact on one of its two faces with the fluid kept under pressure, so that said first lip seal is never subjected to any differential pressure.

5. The seal assembly according to claim 3, wherein: the threads are multiple pitch threads inclined by 75° in relation to the generating line, having a rectangular cross-section whose width is in the order of a millimeter and whose depth is in the order of two tenths of a millimeter.

6. The seal assembly according to claim 5, wherein: the gap between two parallel thread portions is in the order of a millimeter.

7. The seal assembly according to claim 1, wherein: the shortest thread consists of a helical thread having a multiple pitch cut on the shaft in the opposite direction to the longest thread so that the shortest thread exerts on the liquid film a discharging action tending to compensate the pressure applied to the viscous liquid by the second tank.

8. The seal assembly according to claim 7, wherein: the second tank of viscous liquid is kept at atmospheric pressure through a valve and the second lip seal is in contact with atmospheric pressure so that when the shaft is in rotation, said second lip is subjected to no differential pressure.

9. The seal assembly according to claim 8, wherein: the second lip seal is strengthened by a metal reinforcing part enabling the lip seal to bear the full pressure when the rotating shaft is stopped.

10. The seal assembly according to claim 7, wherein: the second lip seal is a compound seal having a U-shaped cross-section completed by an O ring having a circular cross-section and concentrically positioned therein.

11. The seal assembly according to claim 8, wherein: the second tank of viscous liquid comprises a membrane which is permeable to gases and impermeable to the viscous fluid.

12. The seal assembly according to claim 1, wherein: the wall bears cooling fins.

13. The seal assembly according to claim 1, wherein: the threads and the groove are cut in the inside face of said sleeve mounted within the bore.

14. The seal assembly according to claim 13, wherein: an annular space filled with said high pressure fluid surrounds a major portion of the sleeve.

15. The seal assembly according to claim 1, wherein: the viscous fluid is glycerine.

16. The seal assembly according to claim 1, wherein: the viscous fluid is a silicone.

17. The seal assembly according to claim 1, wherein said sleeve comprises a metal sleeve on whose inside face are cut said first and second threads of unequal length and having reverse pitches and, on either side of said sleeve, said lip seals comprise two elastomer seals arranged symmetrically, both extended inwards by a tubular part made of an elastomer, the space between the first elastomer seal and the first thread being filled with a viscous liquid coming from a tank kept at the pressure of the enclosure, whereas the space between the second elastomer seal and the second thread is filled with the same viscous liquid coming from a second tank kept at atmospheric pressure, and wherein the sleeve is suspended in a resilient manner, surrounding the shaft by means of paired tubular parts.

18. The seal assembly according to claim 17, wherein: the sleeve bears, at least at one of its ends, circumferentially spaced notches having a triangular cross-section having a short length, arranged symmetrically in relation to the axis of rotation, and cut in the side of the sleeve facing the shaft.

* * * * *